July 28, 1936.                L. F. BURGER                2,048,918
                          MANIFOLD CONSTRUCTION
                        Filed April 12, 1933           3 Sheets-Sheet 1
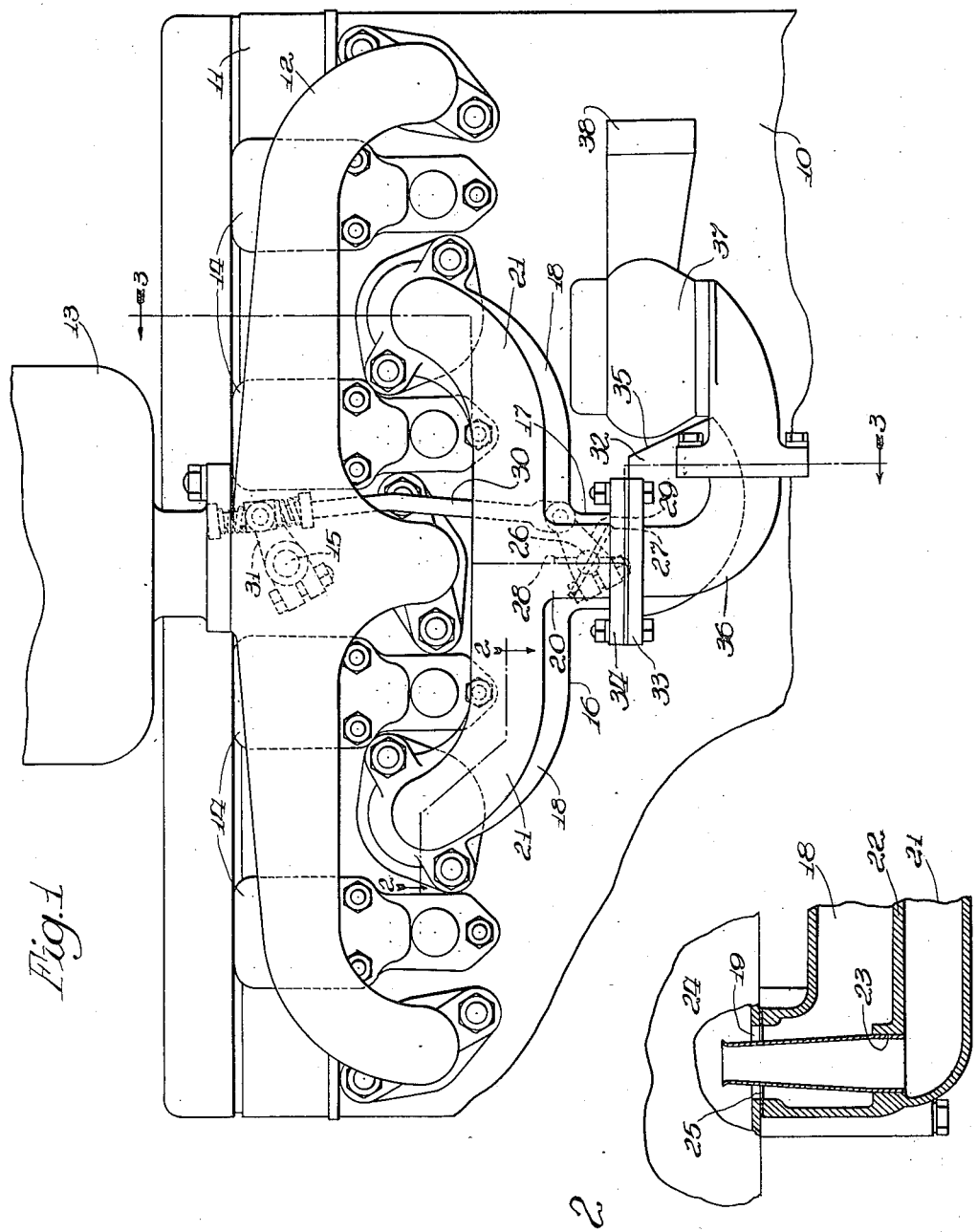
Inventor
Leopold F. Burger
By [signature]
       Atty.

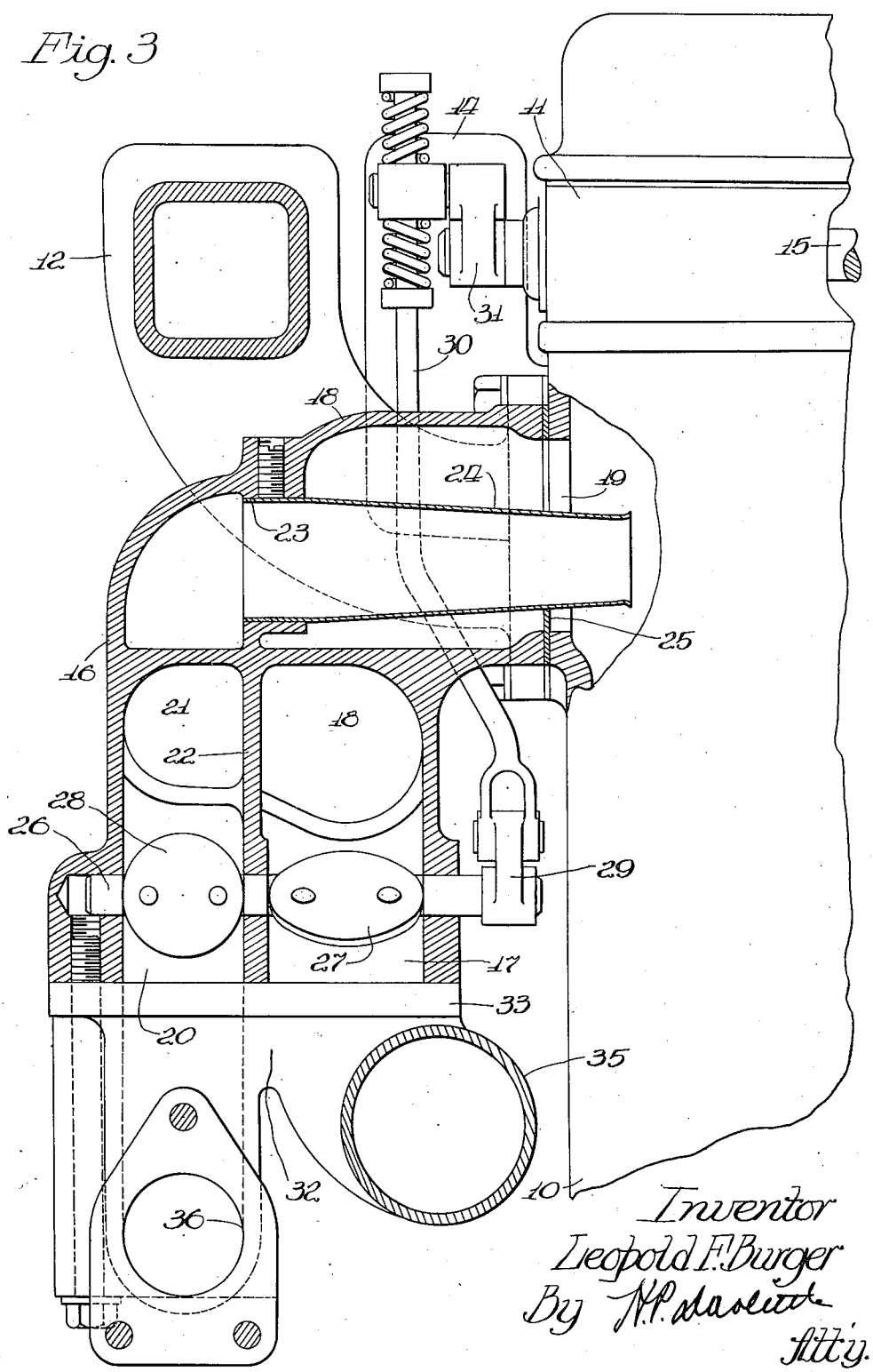

July 28, 1936. L. F. BURGER 2,048,918
MANIFOLD CONSTRUCTION
Filed April 12, 1933 3 Sheets-Sheet 3
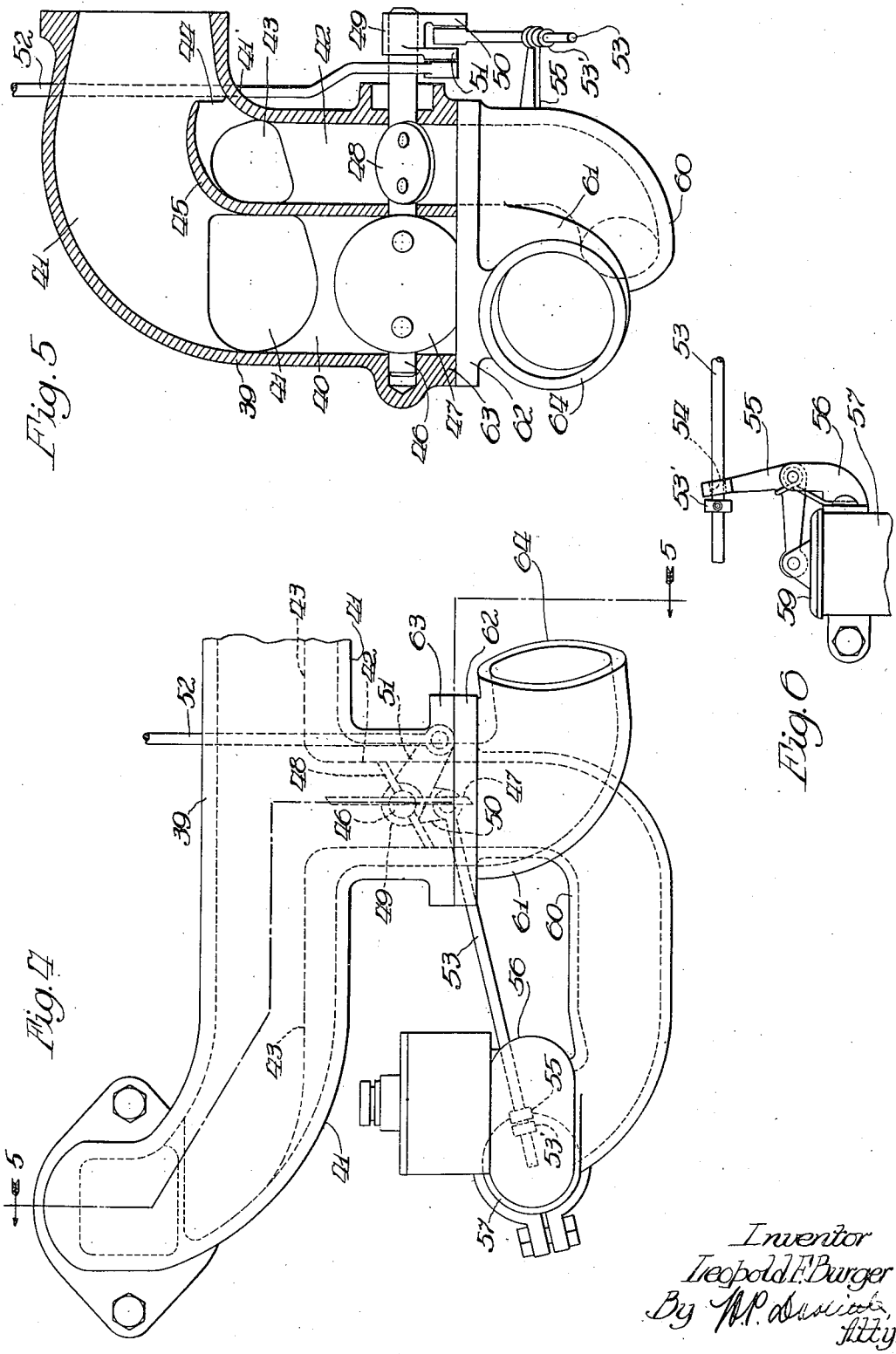
Inventor
Leopold F. Burger
By [signature], Atty.

Patented July 28, 1936

2,048,918

UNITED STATES PATENT OFFICE 2,048,918

MANIFOLD CONSTRUCTION

Leopold F. Burger, Riverside, Ill., assignor to International Harvester Company, a corporation of New Jersey Application April 12, 1933, Serial No. 665,638

10 Claims. (Cl. 123—27)

This invention relates to internal combustion engines. More specifically it relates to a manifold construction for the intake system of solid injection engines equipped with volatile mixture starting means.

In the starting of high compression engines of the solid injection type, commonly designated as Diesel engines, one method which has been used is first to initiate operation of the engine with lowered compression with a volatile mixture and spark plug ignition and subsequently to shift over to high compression with solid injection and compression ignition. The Wentworth patent #1,225,295 discloses a starting arrangement of this kind. Applicant's copending application, Serial No. 558,499, filed August 21, 1931, discloses and claims a particular construction and mechanism for starting by this method.

In the operation of compression ignition solid injection engines which are first started by the use of a volatile mixture, difficulties have been experienced in conducting the mixture from a carburetor to the intake ports of an engine. One of these difficulties is that the air intake for the operation of compression ignition is so large in cross section, in order to reduce friction losses to a minimum that it is difficult to supply volatile mixture for low engine speeds through a manifold and obtain proper distribution. Another difficulty is that any gasoline remaining on the walls of the air intake manifold after shifting over to compression ignition, is carried into the engine, causing thereby serious pre-ignition and detonation until it has been cleaned off the walls. This is particularly undesirable because of the choking action usually necessary at the beginning of operation during which liquid fuel is delivered through the intake conduits.

The principal object of the present invention is to construct an intake system for solid injection compression ignition engines equipped with volatile mixture starting means of an improved design.

A more specific object is to provide an independent manifold for the volatile mixture which interferes to the minimum degree with the air flow of the main air intake manifold.

Another object is to so construct the delivery outlet ends of the main air intake manifold and the volatile mixture manifold so that unvaporized hydrocarbons from the volatile mixture manifold will not drain into the main manifold and will not accumulate at locations on the intake passages so as to be drawn into the engine with the main air supply after a shift to compression ignition and solid injection.

The above noted objects and others which will be apparent from the detailed description to follow, are obtained by constructions, two modifications of which are shown in the drawings, in which:

Figure 1 is an elevation of the side of the block of a conventional internal combustion engine showing an intake system embodying the present invention; Figure 2 is a section taken on the line 2—2 of Figure 1;

Figure 3 is a section taken on the line 3—3 of Figure 1;

Figure 4 is an elevation of a modified manifold construction embodying the invention;

Figure 5 is a section taken on the line 5—5 of Figure 4; and—

Figure 6 is an enlarged detail showing the closure for the carburetor illustrated in Figure 4.

In Figure 1 a conventional cylinder block 10, having a cylinder head 11, is shown which is provided with a 3-port exhaust manifold 12 connected to a muffler 13. Auxiliary compression chambers 14, by means of which compression is lowered for operation on a volatile mixture, are mounted on the engine as illustrated. The means by which the compression is lowered have not been shown as they do not form a part of the present invention. A transverse shaft 15, which is a part of the mechanism for shifting from volatile mixture to compression ignition, or from Otto to Diesel cycle, is illustrated.

A unitary casting 16, which is a duplex manifold, is secured to the engine block in the usual manner. Said manifold is provided with two independent conduits or manifolds, as will be hereinafter described. The inner manifold, which provides the main air intake for the engine for operation on solid injection, is formed by a riser 17 and two branch conduits 18. Said conduits, as best illustrated in Figure 2, connect with the inlet ports 19 of the engine. The second manifold, which forms the volatile mixture supply for the engine, is formed by a riser 20 and two branch conduits 21. The two manifolds are integrally formed in the casting 16 being separated by a common wall 22.

The branch conduits 21 of the volatile mixture manifold communicate with the main air inlet manifold by means of openings 23 formed in the common wall between the two maniolds at the outlet ends of the branch conduits. Conical sheet metal members 24 fitted into openings 23 in a gastight manner, extend through the main manifold into the inlet ports of the engine block. Said members are spaced from the walls of the opening and of the inlet port opening and are small enough in size to have little effect upon the air flow. A shield 25, fitted between the outlet end of the manifold and the inlet port of the engine, is provided with a lower web which surrounds the underneath side of the member 24. The purpose of this member is to prevent liquid fuel from the volatile mixture from running back in the main air inlet.

A transverse shaft 26 extends diametrically through the risers 17 and 20 of the respective manifolds. Butterfly valves 27 and 28, positioned in the risers 17 and 20, are arranged at an angle of substantially 90 degrees with respect to each other, whereby when the shaft is rotated, one of the risers is closed when the other is opened. The valves are not at exactly right angles to each other as it is common practice to construct valves oval in shape whereby they may be fitted at a substantial angle with respect to the axis of the bore being closed.

A lever arm 29, rigidly mounted on the shaft 26, is resiliently connected by a link 30 to a lever arm 31 mounted on the shaft 15. It will be understood by this construction that the main air intake may be cut off when communication is made with the volatile mixture supplying means and that the volatile mixture source of supply may be cut off when the main air inlet is put into communication with the main air intake manifold.

A unitary casting 32, provided with a flange 33 by which it is connected to a flange 34, formed on the double manifold casting, is provided with an air inlet conduit 35 and a conduit 36 connected with the discharge outlet of a carburetor 37. Said carburetor is of any conventional construction and is provided with an air inlet 38.

The operation of the form of my invention, as above described, will be apparent from the description. As illustrated in Figure 3, the butterfly valve 28 is in open position and the valve 27 is in closed position when the engine is to be put into operation. The volatile mixture formed in the carburetor 37, is drawn in through the inlet 36, the riser 20 and the branches 24 of the volatile mixture manifold, through the members 24 into the intake ports of the engine. The manifold is made small in cross section whereby a sufficient velocity of the mixture is maintained to provide good distribution and to prevent dropping out appreciable amounts of the fuel which may not be properly vaporized. It will be noted that due to the construction of the members 24 and their relative position with respect to the inlet ports of the engine, that the volatile mixture is delivered directly into the inlet ports. When the engine has been put into operation and has warmed up on a volatile mixture, the shaft 15 is rotated by suitable mechanism, not shown, to close the valve 28 and open the valve 27. This immediately cuts off the volatile mixture and opens the large main air intake manifold for operation on compression ignition with solid injection.

Figures 4, 5 and 6 show a modified construction as in these figures the inlet ports of the engine have not been shown. It is to be understood that the outlets of the manifold, as shown, are adapted to be clamped into communication with the inlet ports of the engine. An integral casting 39 is formed as a duplex or double manifold incorporating two independent conduits. An outer main air inlet conduit is formed with a riser 40 and branches 41 leading to the outlet end which is adapted to be positioned in communication with the inlet ports of an engine. An inner manifold is formed with a riser 42 and branches 43. The branches 43 communicate with the outlet end of the branches 41 of the main intake manifold through flattened openings 44 formed by a common wall 45 which divides the casting into the two sets of conduits and by the lower wall 41' of the outlet end of the branches 41. Said wall 45 is bent over, as shown, in the direction of the outlet to form the minimum obstruction to air flow through the main air intake manifold as the engine is operated, except for starting, with solid injection, air only being drawn in through the manifold.

It will also be noted that due to the position of the volatile mixture manifold on the inside and at the outlet ends beneath the main manifold that there is no possibility of liquid fuel running back into conduits of the main manifold or collecting on the walls thereof. Any liquid fuel which may collect has a tendency to run back into the branches 43 and into the riser 42.

A shaft 46 extends diametrically through the risers 40 and 42. Butterfly valves 47 and 48 are mounted on said shaft in the respective risers 40 and 42. The valves are positioned at substantially right angles to each other, whereby when the shaft is rotated one riser is closed when the other is opened. The valves are not at right angles to each other as in valves of this type oval and butterfly members are used which close the cylindrical risers at angular positions with respect to the axis of said risers. A member 49, rigidly secured to the shaft 46, is provided with lever arms 50 and 51. The lever arm 51 is pivotally connected to a link 52 which extends upwardly and is adapted to be operated for shifting the valve by, for example, a mechanism as illustrated and described in the form of the invention shown in Figures 1 to 3. The lever arm 50 is pivotally connected to a link 53, which extends downwardly, as shown in Figure 4, and slidably through an opening 54 formed in a bell crank member 55. Said member is pivoted on a bracket 56, secured to the intake 57 of a carburetor 58.

A stop 53', mounted on the link 53, is positioned to engage the arm of the bell crank through which the link extends when the link is moved in an upward direction. The other crank of the bell crank is pivotally connected to a closure 59 which is adapted to seat over the intake 57 of a carburetor and to seal said intake against the inlet of air. The carburetor 58 is mounted on a conduit portion 60 of a casting 61. Said casting is provided with a flange 62 for connection with a flange 63 formed on the main manifold casting 39. The conduit 60 is formed to register with the riser 42. A main air inlet conduit 64 is also formed in the casting, positioned to register with the riser 40 of the main air intake manifold.

The operation of the modification shown in Figures 4 to 6, is substantially the same as previously described in the explanation of the form shown in Figures 1 to 3. Figures 4 to 6 show the shaft 46 in a position with the butterfly valve 47 in open position, whereby the main air intake manifold is open to the flow of air. The riser 42 is closed by the butterfly valve 48 and the closure 59 is seated on the intake 57 of the carburetor. Said closure not only prevents any flow of air through the carburetor but also prevents the settling of dirt within the carburetor. This is a particularly important feature as an air cleaner is usually not installed on a starting carburetor of this type due to the small percentage of time of its operation, the air cleaning means being connected with the main air inlet conduit 64. It will be understood, therefore, that the valves are shown in a position for operation on compression ignition with solid injection. To shift the valves for starting on a volatile mixture the link 52 is moved upwardly, whereby the valve 48 is opened, the valve 47 is closed, and the closure 59 is lifted from the intake of the carburetor. Volatile mixture is, with this setting of the valves, drawn through the riser 42, the branches 43 and the openings 44 into the outlet end of the branches 41 of the main intake manifold and into the intake ports of the engine. Any liquid fuel which collects, cannot drain back into the main air intake manifold. This is a particularly important feature as the presence of gasoline or similar volatile fuel, even in small quantities, in a compression ignition engine causes pre-ignition and serious detonation. It was to avoid difficulties due to the presence of gasoline vapors during initial operation on compression ignition that the intake systems herein disclosed were particularly designed.

It is to be understood that only preferred embodiments of the improved intake system have been illustrated and described and that applicant claims as his invention all modifications falling within the scope of the appended claims.

What is claimed is:

1. A gaseous fluid supply system for engines equipped with liquid fuel injection means and with means for starting on a volatile mixture cycle, comprising, in combination with an engine block having an inlet port, an inlet conduit communicating with said port and being open to the atmosphere for the intake of air during operation with fuel injection, a second inlet conduit for volatile mixture communicating with said port and with a carburetor, said conduit extending substantially through the main air inlet conduit and within the intake port of the block, and valve means for controlling fluid flow through said conduits.

2. A manifold for Diesel engines equipped with gasoline starting means, comprising, in combination with the engine block, a manifold provided with a main air inlet conduit formed therein communicating with the inlet ports of the engine, a valve positioned in said conduit, said manifold being also provided with an auxiliary conduit formed therein, said conduit being connected to the inlet ports of the cylinder block by extensions projecting through the main conduit and into said ports, a valve in said auxiliary conduit, and a means for mounting a carburetor with its discharge outlet in communication with the inlet of said auxiliary conduit.

3. A manifold for Diesel engines equipped with gasoline starting means, comprising, in combination with the engine block, a manifold provided with a main air inlet conduit formed therein communicating with the inlet ports of the engine, a valve positioned in said conduit, said manifold being also provided with an auxiliary conduit formed therein, said conduit being connected to the inlet ports of the cylinder block by extensions projecting through the main conduit and into said ports, a valve in said auxiliary conduit, the valves in the two conduits being connected for simultaneous operation, one of said valves being closed when the other is open, and a means for mounting a carburetor with its discharge outlet in communication with the inlet of said auxiliary conduit.

4. A manifold for Diesel engines equipped with gasoline starting means, comprising, in combination with the engine block, a manifold provided with a main air inlet conduit formed therein communicating with the inlet ports of the engine, a valve positioned in said conduit, said manifold being also provided with an auxiliary conduit formed therein, said conduit being connected to the inlet ports of the cylinder block by extensions projecting through the main conduit and into said ports, a valve in said auxiliary conduit, said valves being of the butterfly type and being mounted on a single shaft extending diametrically through both conduits, the valves being positioned at substantially right angles to each other whereby one valve is open when the other is closed, and a means for mounting a carburetor with its discharge outlet in communication with the inlet of said auxiliary conduit.

5. A manifold system for Diesel engines provided with gasoline starting means, consisting of a main manifold communicating with the inlet ports of the cylinder block for the supply of air and an auxiliary manifold for the supply of a combustible gaseous mixture, said auxiliary manifold being provided with discharge conduits extending through the main manifold and adjacent the inlet ports of the cylinder block.

6. A manifold system for Diesel engines provided with gasoline starting means, consisting of a main manifold communicating with the inlet ports of the cylinder block for the supply of air, an auxiliary manifold for the supply of a combustible gaseous mixture, said auxiliary manifold being provided with discharge conduits extending through the main manifold and adjacent the inlet ports of the cylinder block, and means provided adjacent the cylinder block and the ends of the discharge members for preventing back flow of liquid fuel into the main manifold.

7. An intake system for solid injection engines equipped with volatile mixture starting means comprising an inlet port, an air conduit communicating with said port, and a volatile mixture conduit communicating with said port, said volatile mixture conduit being arranged with its discharge end below the discharge end of the air conduit whereby condensed liquid from the volatile mixture conduit drains by gravity flow into the volatile mixture conduit.

8. A gaseous fluid supply system for engines equipped with liquid fuel injection means and with means for starting on a volatile mixture cycle comprising in combination with an engine block having an inlet port, an air supply conduit having an outlet end terminating adjacent said port, and an independent volatile mixture supply conduit having an outlet end terminating adjacent said port, said volatile mixture outlet end being positioned with respect to the outlet end of the air conduit to prevent draining of condensed liquid therefrom into the air conduit.

9. A gaseous fluid supply system for engines equipped with liquid fuel injection means and with means for starting on a volatile mixture cycle comprising in combination with an engine block having an inlet port, an air supply conduit having an outlet end terminating adjacent said port, and an independent volatile mixture conduit having an outlet end communicating with said port below the air supply conduit, said outlet end being positioned and formed to receive liquid flowing by gravity from the inlet port whereby said liquid does not drain into the inlet supply conduit.

10. An intake system of solid injection engines equipped with volatile mixture starting means comprising in combination with engine intake ports, a duplex manifold communicating with said inlet ports, said manifold having a conduit for air and a conduit for volatile mixture, said conduits discharging in the inlet ports, and means forming discharge ends for said conduits, the discharge ends of the volatile mixture conduit being positioned with respect to the discharge ends of the air conduit and formed to prevent liquid from the volatile mixture conduit from running by gravity onto the walls of the air conduit.

LEOPOLD F. BURGER.